US008944175B2

(12) United States Patent (10) Patent No.: US 8,944,175 B2
Barger (45) Date of Patent: *Feb. 3, 2015

(54) SOIL AERATOR

(76) Inventor: K. Kent Barger, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,524

(22) Filed: Apr. 24, 2012

(65) Prior Publication Data

US 2013/0014965 A1 Jan. 17, 2013

Related U.S. Application Data

(63) Continuation-in-part of application No. 12/584,890, filed on Sep. 14, 2009, now Pat. No. 8,162,071.

(51) Int. Cl.
A01B 45/02 (2006.01)
A01C 7/06 (2006.01)

(52) U.S. Cl.
CPC ............. A01B 45/026 (2013.01); A01C 7/06 (2013.01)
USPC ................................ 172/21; 172/49; 172/120

(58) Field of Classification Search
CPC ................................ A01B 45/026; A01C 7/06
USPC ................ 172/21, 22, 49, 65, 120, 426, 430; 37/906
See application file for complete search history.

(56) References Cited

U.S. PATENT DOCUMENTS

| 223,336 | A | 1/1880 | Gibson |
| 381,464 | A | 4/1888 | Crane |
| 415,813 | A | 11/1889 | Fox |
| 1,239,294 | A | 9/1917 | Nilsen |
| 1,240,542 | A | 9/1917 | Cassell |
| 1,389,512 | A | 8/1921 | Juopperi |
| 1,397,428 | A | 11/1921 | Kerr |
| 1,641,393 | A | 9/1927 | Mackie |
| 1,807,182 | A | 5/1931 | Stoner |
| 2,755,721 | A | 7/1956 | Rusconi |
| 2,948,345 | A | 8/1960 | Brewster |
| 3,339,643 | A | 9/1967 | Scarborough |
| 3,397,748 | A | 8/1968 | Whitesides |
| 3,611,956 | A | 10/1971 | Moore et al. |
| 3,773,112 | A | 11/1973 | Zinck |
| 4,202,414 | A | 5/1980 | vom Braucke et al. |
| 4,315,547 | A | * 2/1982 | Rau et al. ................ 172/1 |
| 4,492,273 | A | 1/1985 | Fox |
| 4,496,005 | A | 1/1985 | Swartzendruber |

(Continued)

FOREIGN PATENT DOCUMENTS

FR 2703878 A1 10/1994

Primary Examiner — Jamie L McGowan
(74) Attorney, Agent, or Firm — Carrithers Law Office PLLC

(57) ABSTRACT

The aerator rollers project below the frame for rolling engagement with the ground and are located in tandem relation relative to the direction of travel. Each aerator roller has teeth that penetrate the ground surface. The formations on each aerator roller are spaced apart from one another circumferentially around and longitudinally along the roller. Formations on one aerator roller are offset from those on the other roller permitting overlap of same. The aerator rollers are interconnected in drive and driven relation to rotate in a predetermined ratio. A hopper mounted on the frame dispenses seeds, fertilizer or the like. A rear depth control roller assembly using one or more rollers or wheels is pivotally mounted on the frame and can be brought into rolling engagement with the ground to control the depth of penetration of the formations of the aerator rollers into the ground.

28 Claims, 12 Drawing Sheets

(56) References Cited

U.S. PATENT DOCUMENTS 6,148,928 A 11/2000 Spears
6,904,979 B1 6/2005 Confoey
2008/0053671 A1 3/2008 Buckrell

* cited by examiner

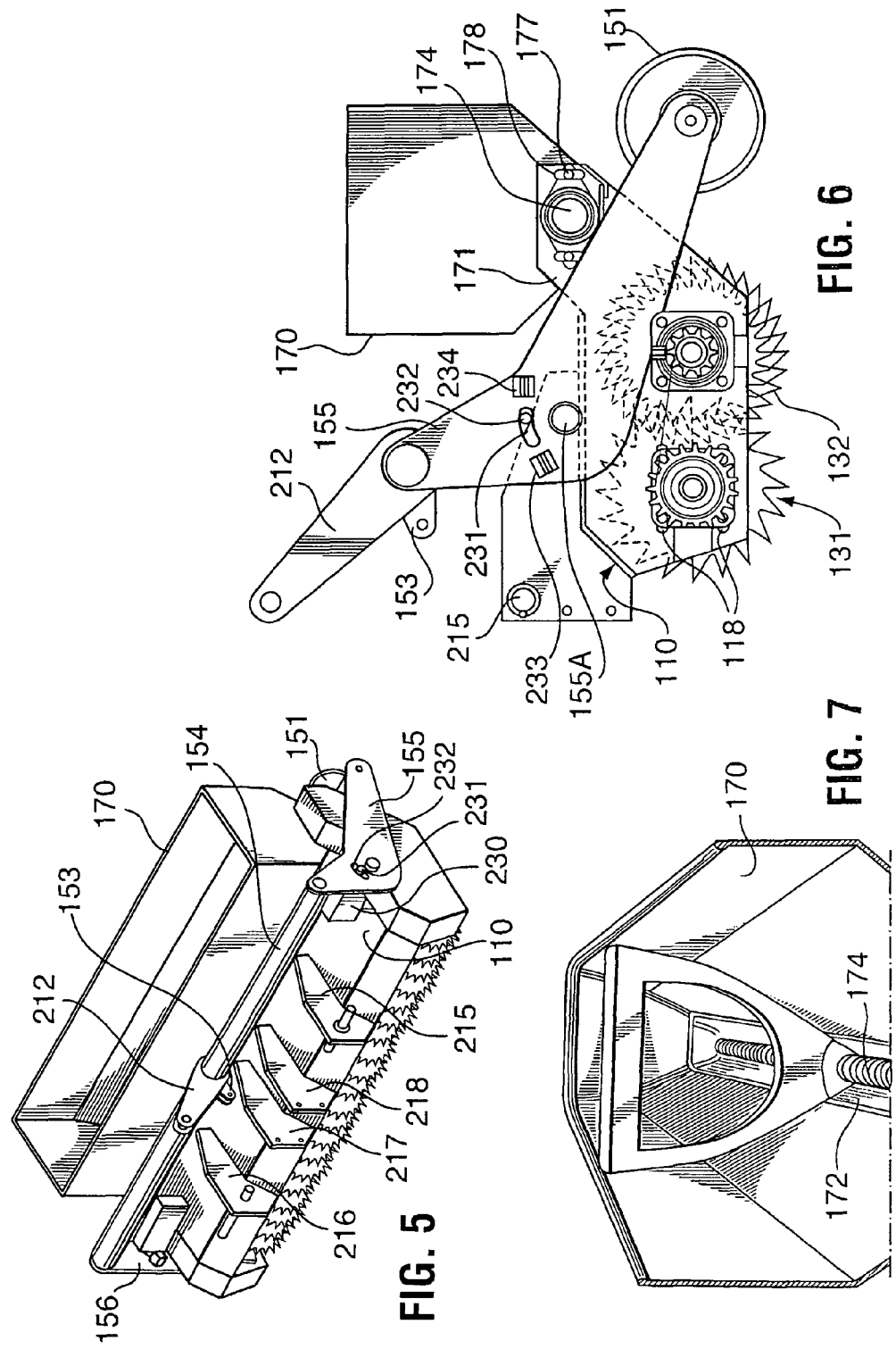

SOIL AERATOR

CROSS REFERENCE TO RELATED APPLICATIONS

This application is a Continuation-In-Part application claiming priority from U.S. Pat. No. 8,162,071 which issued on Apr. 24, 2012 from application Ser. No. 12/584,890 filed on Sep. 14, 2009 which is incorporated by reference herein in their entirety.

FIELD OF INVENTION

This invention is directed to an implement for aerating soil and more particularly one which at the same time is capable of performing additional functions such as seeding and distribution of fertilizer.

BACKGROUND OF INVENTION

Compacted soil restricts the amount of oxygen that can enter the soil and the amount of carbon dioxide that can escape. Aeration reduces ground compaction increasing permeability of the soil and thereby stimulates plant growth.

Soil aerators are known one type of which removes plugs of soil and another type in which spikes penetrate the soil surface. Both are dedicated single function implements.

Not all soils are the same and therefore a single process function may not be applicable to all conditions. A machine that utilizes spikes may not provide adequate shear to break apart large solely aerates can be of very limited use. Also gardeners in addition to periodic aerating often at the same time follow this with scarify the soil or de-thatch a lawn and/or applying grass seed and/or granular feed and/or weed killer.

The instant invention provides an aerator utilizing a plurality of blades having teeth extending therefrom and is capable of performing de-thatching, seed application, fertilizer or lime application, weed killer applications as well as additional functions.

SUMMARY OF INVENTION

The present invention provides an implement for conditioning the surface of the ground while being moved thereover. The implement comprises a rigid frame assembly having a pair of aerator rollers jounalled thereon for rolling engagement with the ground surface. The pair of aerator rollers are located one behind the other in tandem relation relative to the direction of travel of the implement during use thereof Each aerator roller has a plurality of formations defining blades having teeth that penetrate the ground surface of the soil. The formations are disposed in selected spaced apart relation circumferentially around and longitudinally along the aerator roller associated therewith. Drive means interconnecting the aerator rollers provide interrelating rotation of the same in a predetermined ratio.

An object of the present invention is to provide a simple aerating implement.

A further object of the present invention is to provide a robust aerating implement.

A further and principal object of the present invention is to provide a multi-function aerating implement.

Another object of the present invention is to provide an aerator including a hopper for holding seeds or fertilizer for distribution of same.

Another object of the present invention is to provide an apparatus providing periodic aerating of the soil and optionally follow this with scarify the soil or de-thatch a lawn and/or applying grass seed and/or granular feed and/or weed killer.

It is another object of the present invention to overlap the front and rear blades of each roller providing a self cleaning action in wet or damp ground.

It is another object of the present invention to utilize a plurality of blades having cutting teeth as opposed to spikes.

Moreover, the aerator implement is provided that conditions the ground surface as it is moved there over aerating the soil and distributing fertilizer and/or seeds thereon. The implement consists essentially of a pair of aerator rollers mounted on a frame that can be towed by a tractor or constructed so as to be self-propelled if so desired. The aerator rollers project below the frame for rolling engagement with the ground and are located one behind the other in tandem relation relative to the direction of travel of the implement during use thereof. Each aerator roller has a plurality of formations defining teeth that penetrate the ground surface. The formations on each aerator roller are spaced apart from one another circumferentially around and longitudinally along the roller associated therewith and such formations on one aerator roller are offset from those on the other roller permitting overlap of the same. The aerator rollers are interconnected in drive and driven relation to rotate in a predetermined ratio. A hopper mounted on the frame dispenses seeds, fertilizer or the like if so desired. A rear depth control roller assembly using one or more rollers or wheels is pivotally mounted on the frame and can be brought into rolling engagement with the ground to control the depth of penetration of the formations of the aerator rollers into the ground.

Other objects, features and advantages of the invention will become apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 5 is a frontal oblique view, similar to FIG. 1, illustrating a second embodiment of applicants implement;

FIG. 6 is a left hand side view of the implement shown in FIG. 5;

FIG. 7 is an oblique top view of a portion of the hopper showing the interior thereof;

DETAILED DESCRIPTION OF PREFERRED EMBODIMENT

Figure 1:
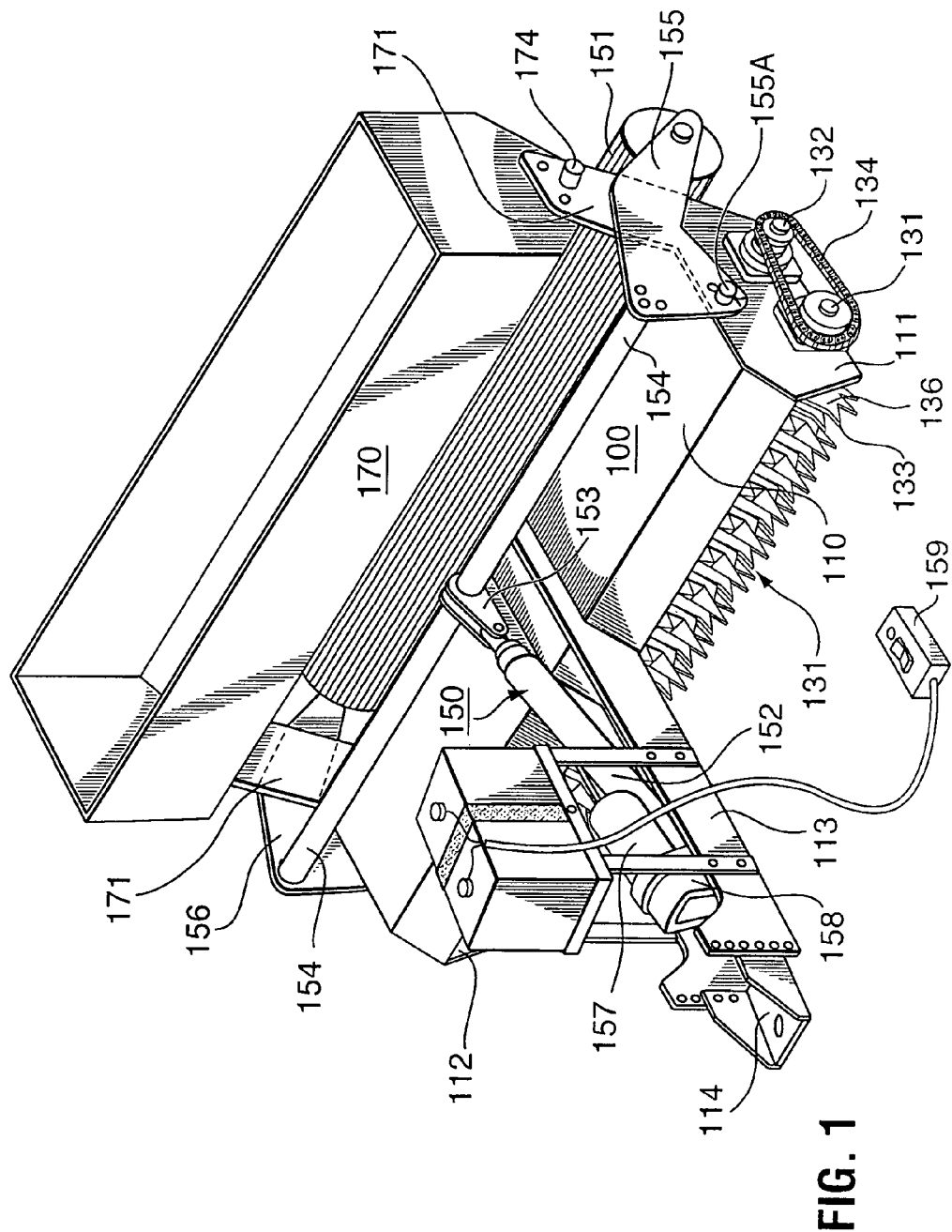
FIG. 1 is a frontal oblique view illustrating one embodiment of applicants implement.
Figure 2:
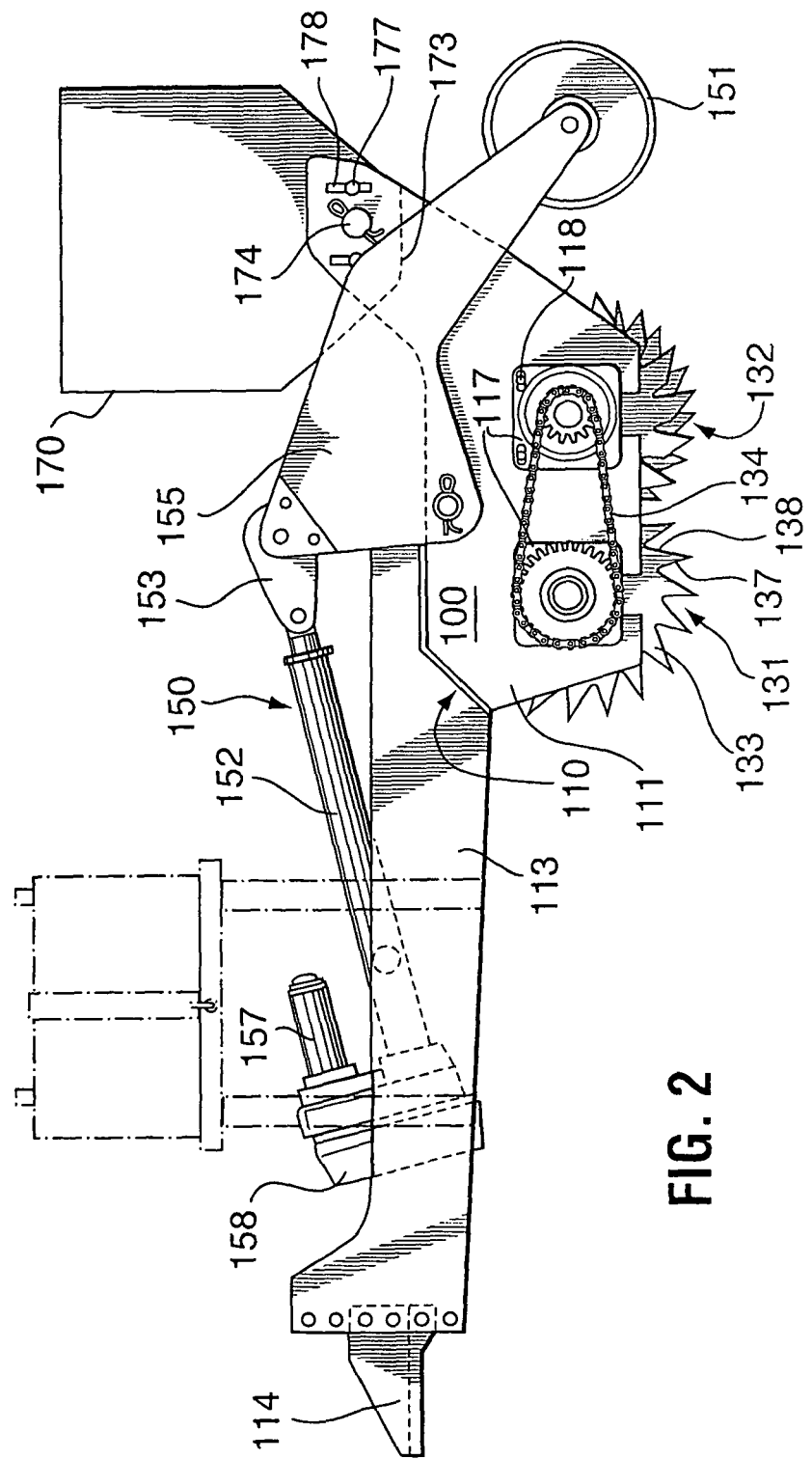
FIG. 2 is a side view showing the left side of the implement shown in FIG. 1.

Illustrated in the drawings is an aerator implement 10 that, in a single pass during operation, conditions the ground surface using an aerator roller assembly 130 and following that applies a treatment thereto if so desired. The ground conditioning includes a first step of aerating or pulverizing with aerator rollers 131 and a second step of de-thatching or scarifying with aerator roller 132. The implement is capable of performing a third step, following the ground conditioning, referred to herein as soil treatment that includes, as maybe desired, seeding and/or applying granular form fertilizer/lime and/or weed killer that is dispensed from a hopper 170 mounted on the implement. Trailing the treatment step is an adjustable depth control unit 151 that in the embodiment seen in FIG. 1 utilizes at least one roller serving as a reaction force point for a depth control system, optional ground compactor and/or a transport roller when used with the three point hitch version or pull version.

The ground conditioning portion of the aerator 10 comprises an aerator roller assembly 130 including a pair of horizontally spaced apart ground engaging aerator rollers 131, 132 mounted on a rigid frame assembly 100. The front aerator roller 131 drives the rear aerator roller 132. Each aerator roller has a plurality of spaced apart blades having teeth 133 projecting therefrom that penetrate a selected depth into the ground surface. These teeth, by way of example, maybe about 1.5" long and shaped so as to have a leading edge 137 radial to the axis of rotation of the aerator roller associated therewith and a trailing edge 138 disposed at an angle of about 30 degrees to the leading edge. One preferred example has a 45° rake angle and 30° relief angle. The teeth or protrusions 133 on the leading aerator roller puncture and cut grooves in the ground as the aerator roller is rolled over the surface thereof and the second or trailing aerator roller 132 is driven by aerator roller 131 via a chain 134 and sprockets to rotate preferably at a speed different from that of the first aerator roller 131 with the ratio of the front roller ranging varying with respect to the rear roller according to the soil conditions and desire of the user. The front roller is usually set to rotate faster than the rear roller. The teeth on the second aerator roller scarify the soil or de-thatch a lawn as the case maybe depending upon the state of the ground surface and speed of rotation thereof relative to the ground speed. In one preferred embodiment the rollers are 4 inches in diameter and the disc have an outside diameter of about 8 inches.

The preferred embodiment utilizes blades having teeth as opposed to spikes because the blades in order to obtain a higher ratio of interlocking of the blades than can be accomplished by spikes which provide a lower surface area for interlocking. Of course both the front aerator roller 131 and rear aerator roller 132 rotate in the same forward direction only at different speeds wherein the rear roller rotates at a faster speed than the front roller. Typical selected rates of rotation may be for example at a ratio of 1:3, 1:2, of a (1:1.4).

The rigid frame assembly 100 includes a downwardly facing concave housing 110 having pair of oppositely disposed end walls 111, 112 and means secured to the housing that is adapted to be connected to a hitch of a tractor, jeep, ATV, mower, horse, or other powered pulling device. The tractor attachment hitch means in one embodiment as best illustrated in FIGS. 1-4 is a forwardly projecting rigid elongate tow bar 113 that connects at its leading end 114 to a tractor draw bar (not shown). The depth of the aerator roller 132 can be adjusted by lifting the rear of the aerator with the rear roller which can be powered by a battery unit.

The implement towing vehicle maybe a tractor, ATV, or the like that pulls the implement over the area selected for treatment. It will be obvious to those skilled in the art that the implement could readily be made so as to be self-propelled, for example, by having a motor mounted thereon and drivingly connected, via a centrifugal clutch (or the like) and chain or V-belt drive train, to the leading aerator roller 131.

Figure 3:
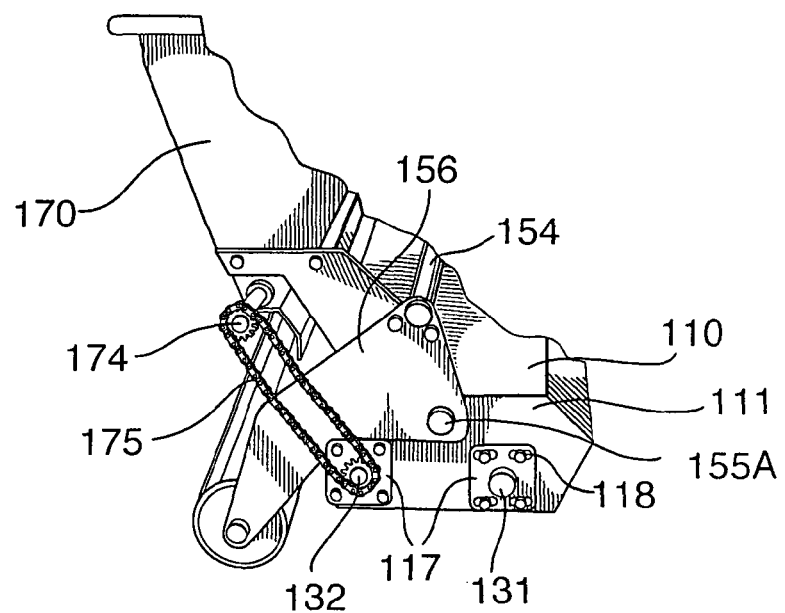
FIG. 3 is a frontal oblique view showing the right hand side portion of the implement shown in FIG. 1.
Figure 4:
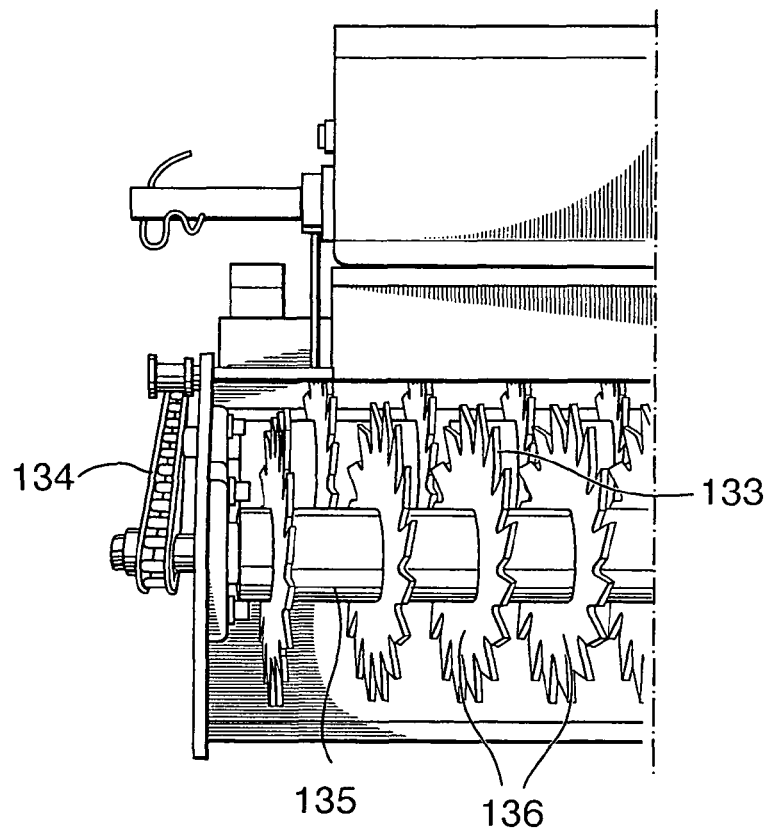
FIG. 4 is an oblique rear view of a portion of the implement shown in FIG. 1.
Figure 8:
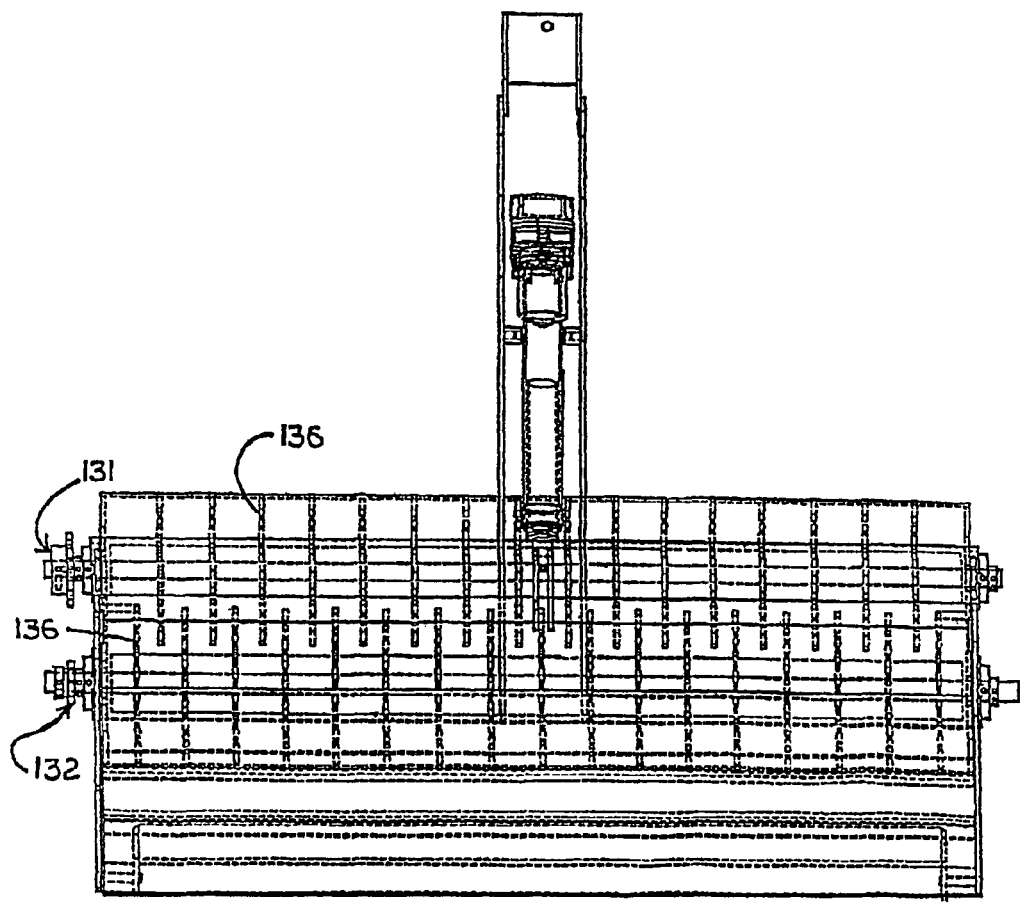
FIG. 8 is a top view showing the spacing and overlap of the blades of the aerator rollers and the rear depth control roller.
Figure 9:
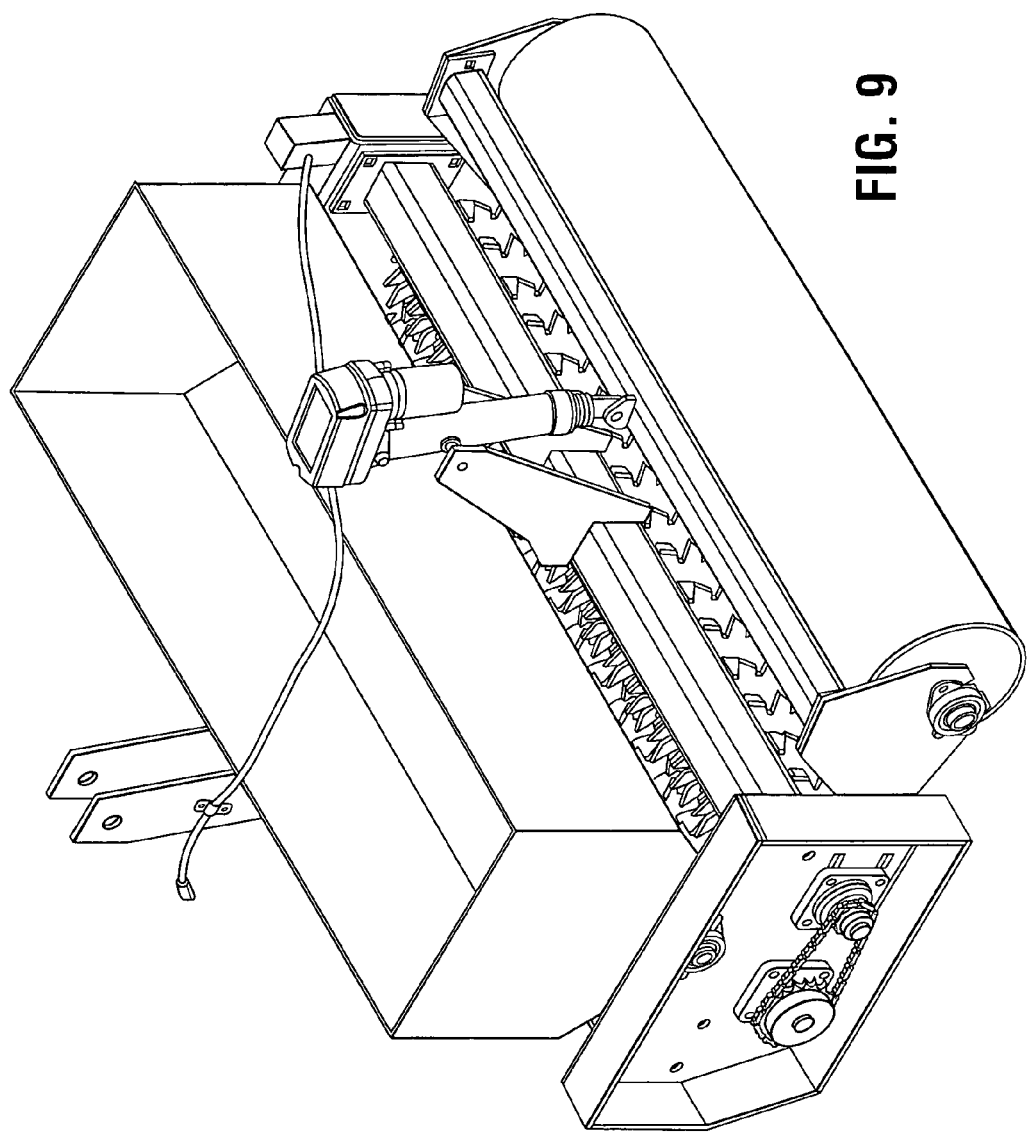
FIG. 9 is a frontal oblique view illustrating an embodiment of applicants implement utilizing an alternate electric hydraulic means connected to a battery with control means on the cylinder and/or an alternate cable cooperatively engagable with a switch of a tractor or other vehicle for raising and lowering the soil aerator rollers and blades by using the rear depth control roller(s) as a means of support wherein the hydraulic means is pivotally mounted to a transverse support member.
Figure 10:
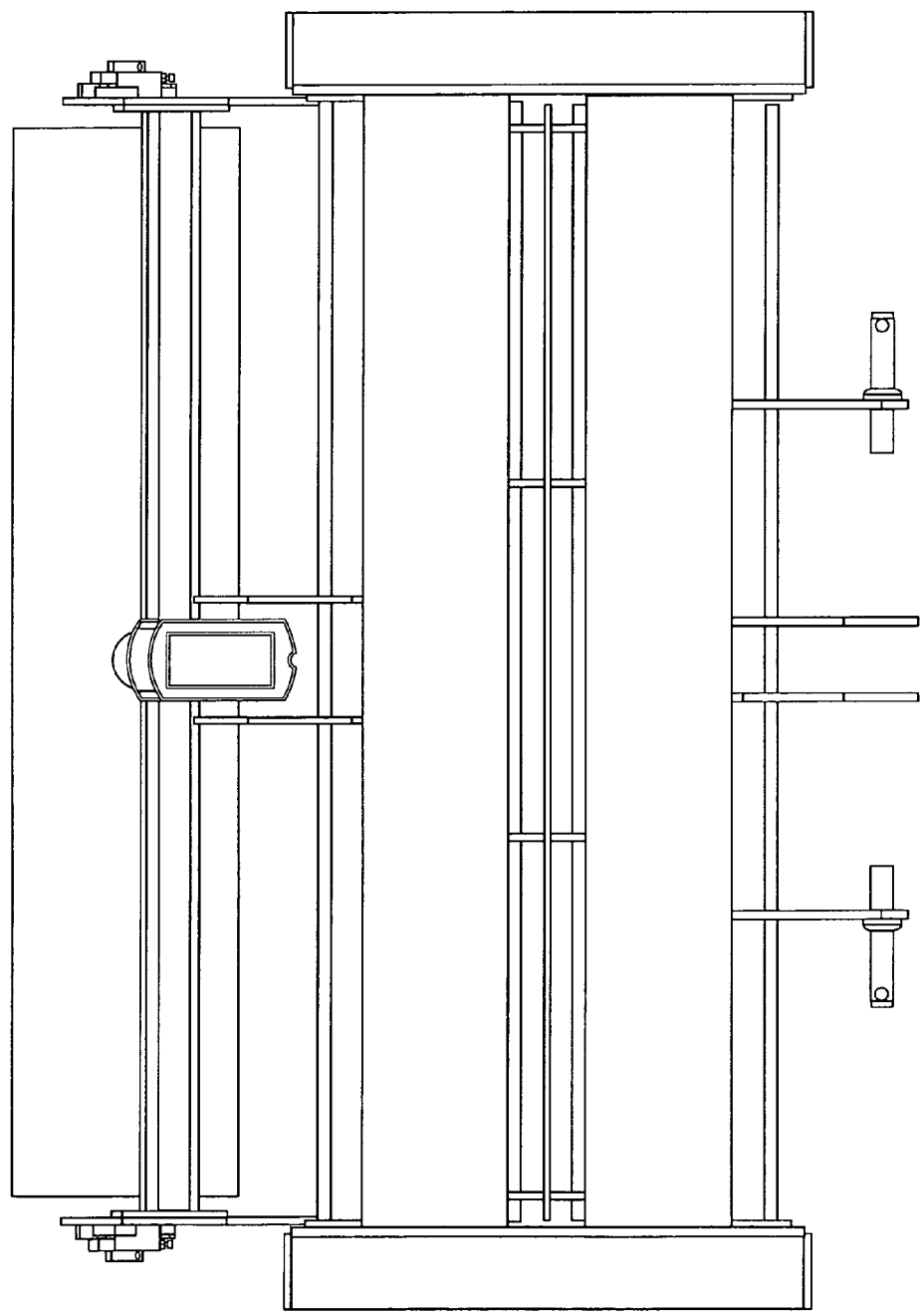
FIG. 10 is a top view of the embodiment of FIG. 9.
Figure 11:
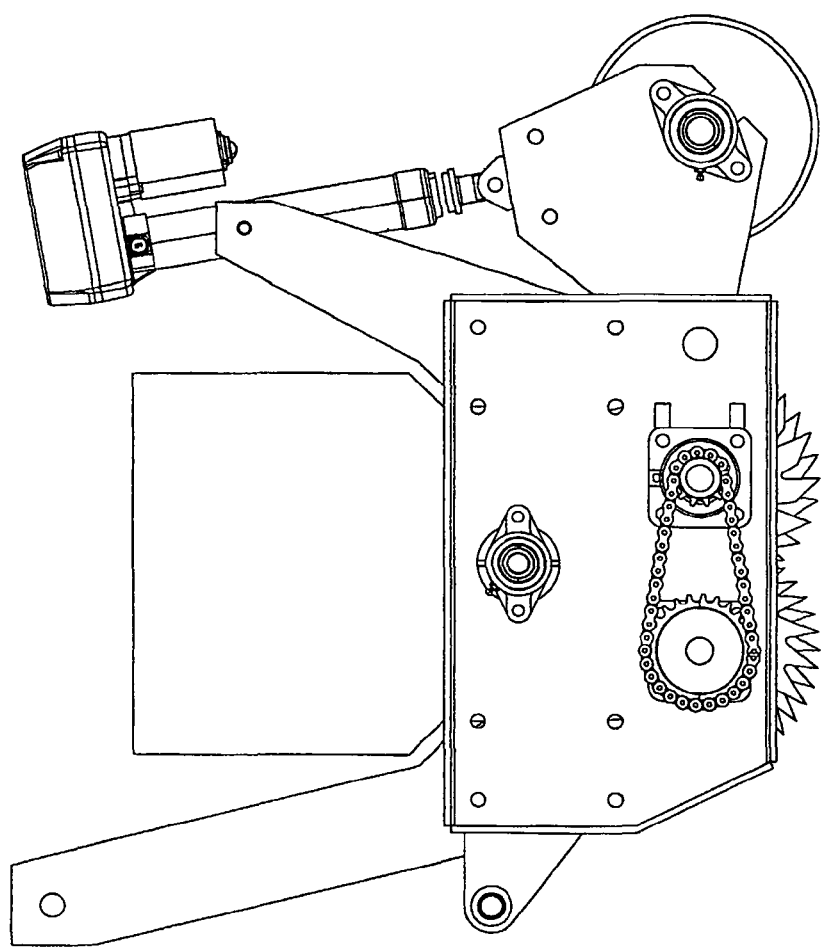
FIG. 11 is a left side view of the embodiment of FIG. 9.
Figure 12:
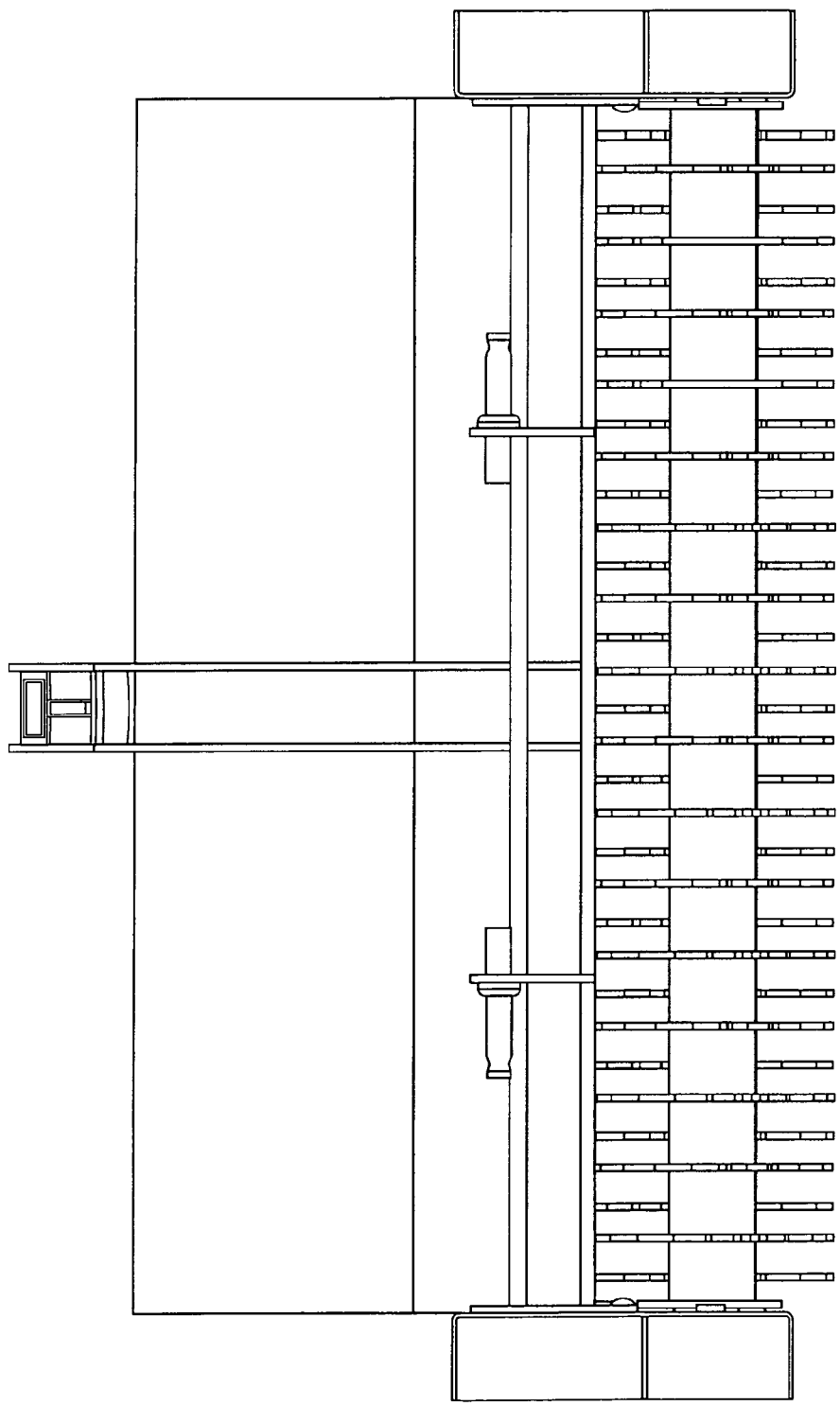
FIG. 12 is a bottom view of the embodiment of FIG. 9.
Figure 13:
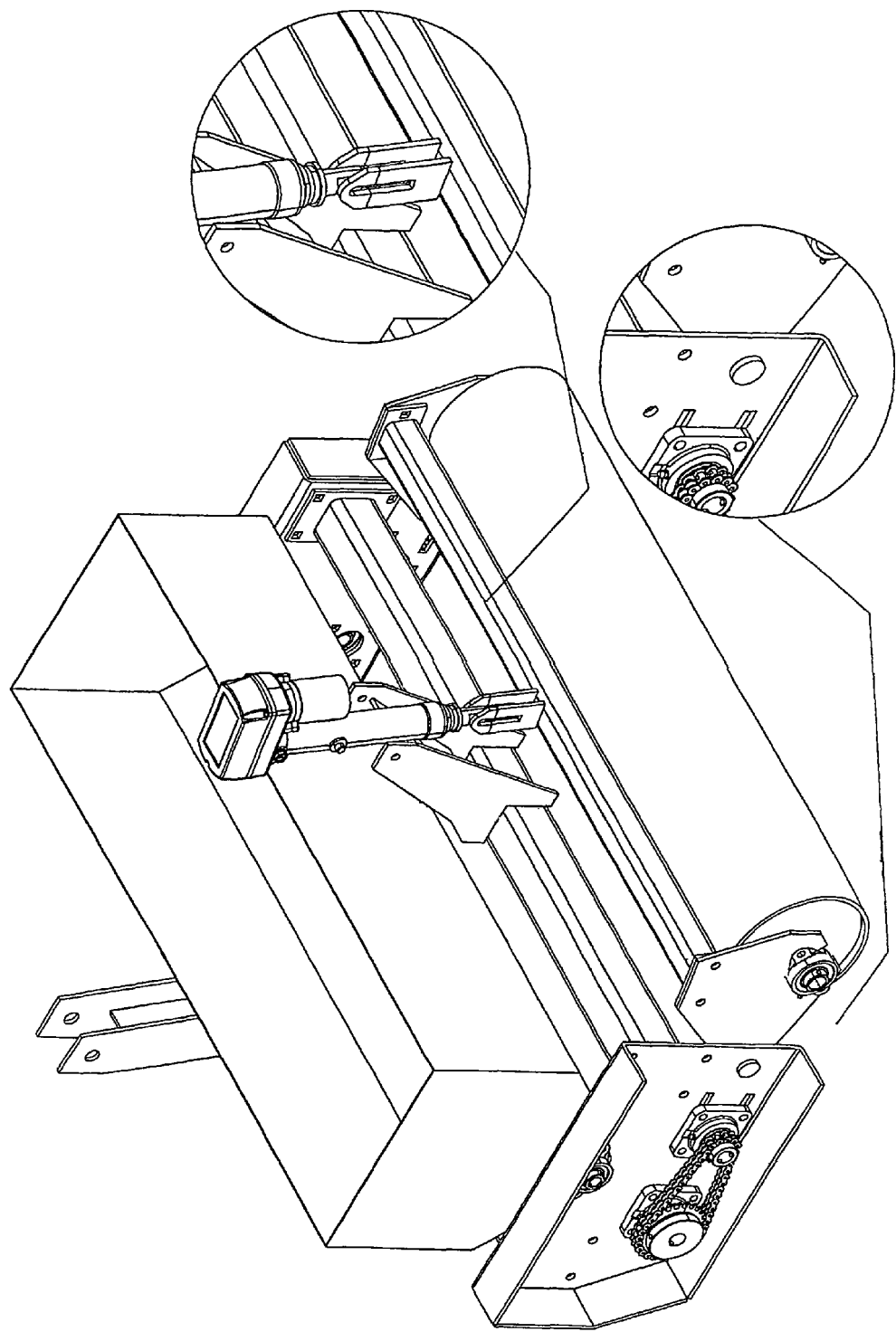
FIG. 13 is a frontal oblique view illustrating an embodiment of applicants implement utilizing an alternate electric hydraulic means connected to a battery with control means on the cylinder and/or an alternate cable cooperatively engagable with a switch of a tractor or other vehicle for raising and lower the soil aerator rollers and blades by using the rear roller(s) as a means of support wherein the hydraulic means is pivotally mounted to a transverse support member utilizing a slotted coupling providing limited floating motion to the rear depth control roller(s)
Figure 14:
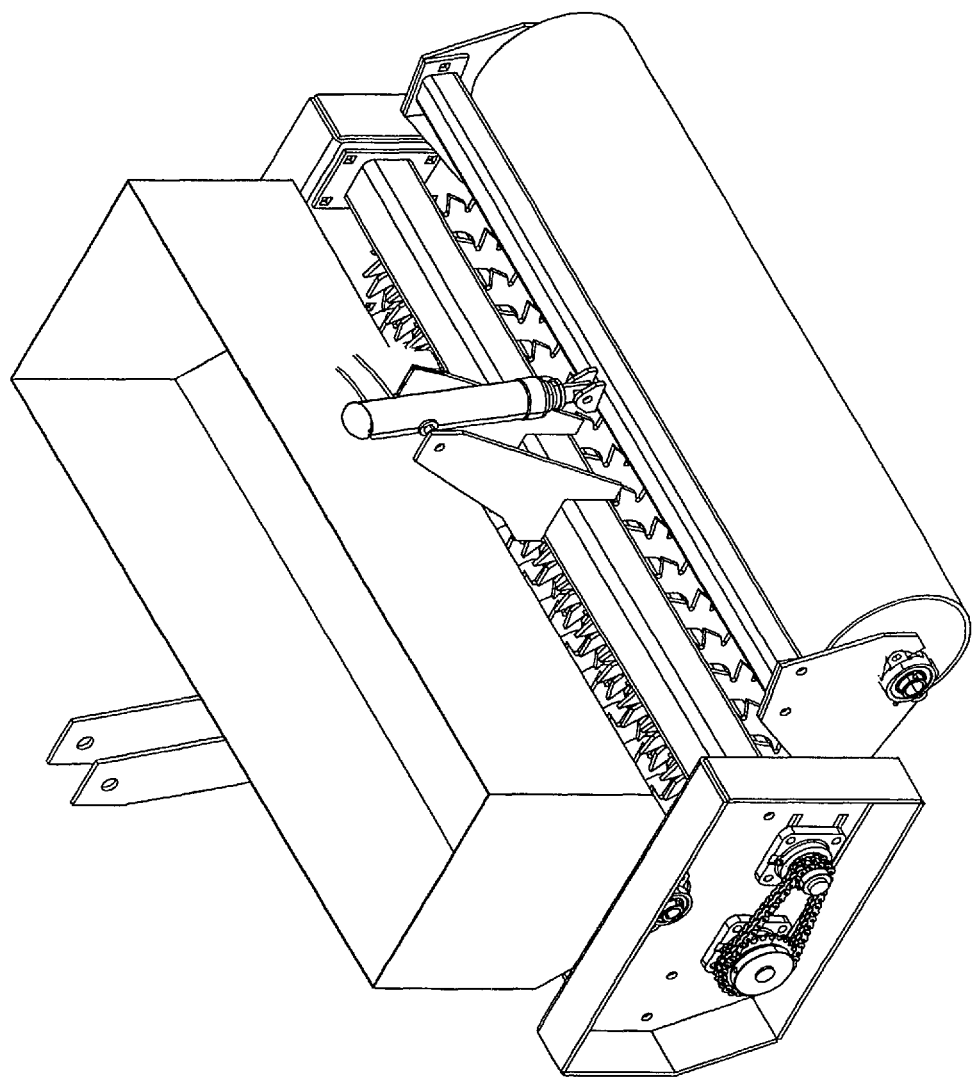
FIG. 14 is a frontal oblique view illustrating an embodiment of applicants implement utilizing an alternate fluid hydraulic means connected to a tractor for raising and lower the soil aerator rollers and blades by using the rear depth control roller(s) as a means of support wherein the hydraulic means is pivotally mounted to a transverse support member.
Figure 15:
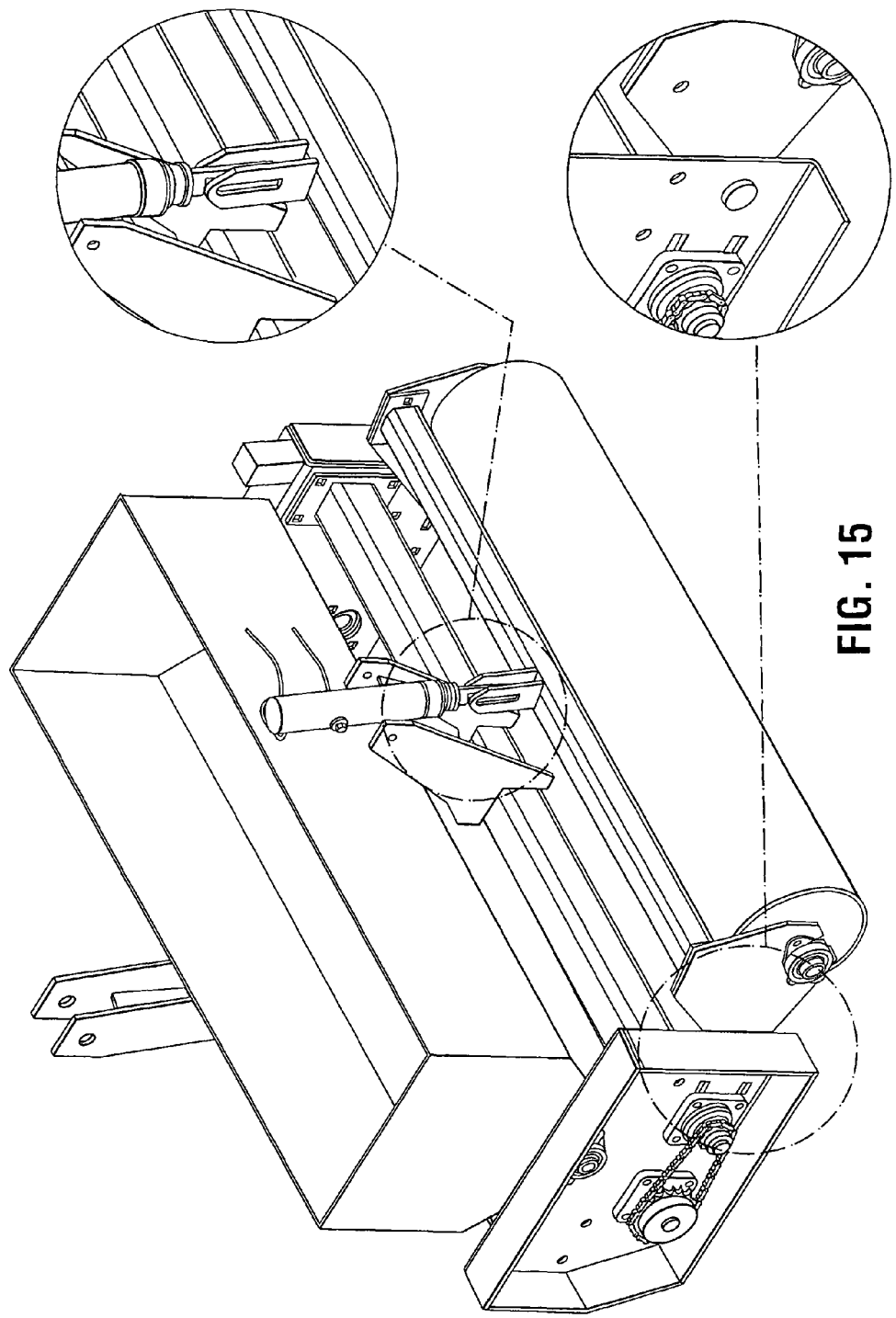
FIG. 15 is a frontal oblique view illustrating an embodiment of applicants implement utilizing an alternate fluid hydraulic means connected to a tractor for raising and lower the soil aerator rollers and blades by using the rear roller(s) as a means of support wherein the hydraulic means is pivotally mounted to a transverse support member utilizing a slotted coupling providing limited floating motion to the rear depth control roller(s).

A hopper 170 is mounted to the top of the rigid frame, by way of mounting brackets 171, for discharging granular contents therein onto the ground behind the trailing aerator roller 132 and in front of the rear compactor roller. The brackets 171 maybe separate bracket members secured to the housing 110 and projecting upwardly therefrom or alternatively an extension of the housing end walls 111, 112 illustrated by way of example in FIGS. 1, 2. Means for controlling the flow of the seeds or granular material is incorporated into the hopper unit. One preferred embodiment uses a slotted plate 192 as shown in FIG. 7 which can be rotated laterally with respect to openings formed in the bottom of the hopper providing uniform distribution of seeds or granular material across the width of the aerator 10. An indicator means such as hash marks can be used to set the size of the openings to control the flow of material there through. Alternately, an adjustable sliding plate or bar 160 having a plurality of openings therein is in movable engagement with a plurality of openings 172 in the bottom 173 of the hopper for varying the size of the openings in order to determine the amount of material dispensing onto the ground such as seeds and/or granular contents, for example fertilizer, moss killer, weed killer or the like. Optionally, an agitator 174 is located within a bottom portion of the hopper to facilitate dispensing of the seeds, granular material etc. The agitator in one preferred embodiment is an elongate shaft that is nonuniform in outline cross-sectional shape and driven by the aerator roller 132 via sprockets and a link chain drive 175 as best shown in FIG. 3. The agitator and aerator roller 132 for example have a rotation ratio of 1:1 when the rotation ratio of aerator roller 132 to 131 is at a 1:3 ground speed. The speed of the agitator may be adjusted by changing the size of the drive gear. Moreover, the variable size outlet openings are commonly found in well known hand pulled garden seed and fertilizer spreaders and thus further description of the same is deemed unnecessary herein. The agitator shaft 174 is mounted on the end walls of the hopper by journals secured by bolt and nut units and suitably located slots are provided that permit adjusting the amount of slack in the drive chain 175.

The two ground engaging soil treatment aerator rollers, for reason of simplicity, are shown herein as being of the same construction but need not be the case if f so desired. Functionally the two shown aerator rollers are distinguished one from the other by their respective speeds of rotation during use of the implement. One preferred rotation ratio of the front aerator roller 131 to the rear aerator roller 132 is (1:2). Other useful settings typically range from 1:4 to a range of (1 to 4) wherein the rear roller is rotating 4 times as fast as the front roller.

Each aerator roller 131, 132 has a central elongate hub 135 with a plurality of plates or blades 136 mounted thereon in spaced apart relation longitudinally there along with a spacing between two adjacent plates being about 3.5". The plates are welded to the hub and each plate or blade has a plurality of the teeth 133 projecting from the outer periphery thereof. The teeth 133 are spaced apart from one another circumferentially around the plate associated therewith and the teeth on one plate are circumferentially offset from those on the next adjacent plate. Each plate has an appearance of a saw blade with a diameter of for example about 8" and a thickness or kerf width that maybe selected as desired taking into account the intended function, soil penetration, wear considerations etc. Moreover, the tooth offset can be adjusted as well.

The aerator rollers 131, 132 are mounted at their respective opposite ends via bearings 117 on the housing end walls 111, 112. The bearings are secured by bolt and nut units with slots 118 in the plates 111, 112 (or bearing flanges) being provided for aerator roller 132. The slots are horizontal and thereby maybe used to adjust the spacing between the aerator rollers 131, 132 and/or change the amount of slack in the agitator drive chain 175.

The aerator rollers 131, 132 are spaced apart horizontally from one another with the spacing there-between being such that the plates on one aerator roller overlap the plates on the other aerator roller as best shown in FIGS. 4, 6, 8, and 9. The blades are spaced about 3.5 inches from one another resulting in a 1 and ¾ inch spacing at the overlap. The overlap blade spacing between the blades and between the rollers is particularly important when the implement is used on wet ground as a slightly wider overlap between rollers contributes to the aerator rollers being self-cleaning. The distance between blades needs to be closer and by way of example the overlap space between the front and rear blades maybe about 2.5 inches with the teeth being about 1.5 inches apart.

The depth adjustment system 150 includes an extendible and retractable hydraulic cylinder unit 152 connected at one end thereof to a lug 153 projecting from a shaft 154 that interconnects a spaced apart pair of arms 155, 156. In the fast hitch embodiment, these arms are pivotally connected intermediate their opposite ends to the respective end walls 111, 112 by pivot pins 155A and 156A. The other end of the unit 152 is anchored to the elongate rigid tow bar 113. The unit 152 is power operated by a hydraulic pump 156 drivingly connected to an electric motor 157 (powered by a battery on the implement or towing vehicle) and controlled via an operator actuated controller 159. The compaction aerator roller 151 is disposed between the trailing ends of the arms 155, 156 with the respective opposite ends connected thereto by suitable axle and journal means. In a second embodiment the end of the unit. Of course, it is contemplated that a lever arrangement could be used to manually adjust the arms and depth or that other means such as a screw jack, or ratchet can be used in place of the hydraulic unit 152 or the equivalent. As best shown in FIG. 6, depth adjustment indicator means 190 is provide whereby a series of hash marks or other indicia is disposed on the lever arm in proximity to the pivot point.

In the three point hitch embodiment as shown in FIGS. 5 and 6, a spaced apart pair of brackets 215, 216 connect to two points (linking arms) of a 3 point tractor hitch. The third hitch point connects to the bracket 212 secured to and projecting from the bar 154. Thus, the entire aerator 10 can be lifted off of the ground for transport. Moreover, the performance of the aerator rollers can be adjusted by lifting the front of the aerator with the tractor lift arms, lifting the rear of the aerator with the rear roller, or both.

Pivotal movement of the arms 155, 156 is restricted by respective ones of a pair of blocking members 230 mounted on the housing 110. These blocking members engage spaced apart stops 233, 234 on the arm (155, 156) associated therewith and also there is a pin 232 that projects into a slot 231.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

I claim:
1. A soil aerator implement for conditioning the surface of the ground while being moved there-over, comprising:
   a rigid frame assembly comprising a downwardly facing concave housing having a pair of oppositely disposed end walls for mounting a front aerator roller and a rear aerator roller jounalled thereon for rolling engagement with the ground surface;
   said rear aerator roller being located behind said front aerator roller in tandem relation relative to the direction of travel of the implement during use thereof;
   said front aerator roller and said rear aerator roller having a plurality of formations that penetrate the ground surface;
   said formations being disposed in selected spaced apart relation circumferentially around and longitudinally along said front aerator roller and said rear aerator roller;
   drive means interconnecting said front aerator roller and said rear aerator roller inter-relating rotation of the same in a predetermined ratio;
   a compaction aerator roller extending from a pair of spaced apart pivot arms pivotally connecting to said rigid frame trailing said aerator roller;
   rear aerator roller depth control hydraulic means for raising and lowering said compaction roller for controlling the depth of said rear aerator roller; and
   wherein said rear aerator roller depth control means includes hydraulic means supported by a transverse longitudinal frame member extending between said end walls supporting said hydraulic means pivotally mounted thereon connecting to a coupling extending from a transverse arm support member disposed between said arms supporting said compaction aerator roller.

2. The soil aerator of claim 1, further comprising a hopper mounting on said rigid frame and means for dispensing seeds, fertilizer, or granular material therefrom.

3. The soil aerator of, claim 2, including means for controlling the flow of the said seeds, said fertilizer, and said granular material flowing from said hopper.

4. The soil aerator of claim 1, wherein said hydraulic means is selected from the group consisting of an electrically driven hydraulic cylinder and a fluid driven hydraulic cylinder.

5. The soil aerator of claim 1, wherein said coupling connected to said hydraulic means comprises a slotted coupling providing limited floating motion to said rear aerator roller.

6. The implement as defined in claim 1 wherein at least one of said front aerator roller and said rear aerator roller includes a plurality of plate-like members defining aerator roller blades disposed in selected spaced apart relation having a plurality of formations projecting from the outer periphery thereof.

7. The implement as defined in claim 6 wherein the spacing between said plurality of formations on said rear aerator roller overlaps a plurality of formations on said front aerator roller.

8. The implement as defined in claim 6, wherein said formations comprise teeth.

9. The implement as defined in claim 6, wherein said blades have a leading edge that extends radially with respect the axis of rotation of the front aerator roller and said rear aerator roller and a trailing edge disposed at a selected angle thereto.

10. The implement as defined in claim 1 wherein said rear aerator roller rotates at a different selected rate of speed than said front aerator roller.

11. The implement as defined in claim 1 wherein said compaction aerator roller comprises a plurality of wheels.

12. The implement as defined in claim 1 wherein said compaction aerator roller comprises at least one roller.

13. The implement of claim 1, wherein said rigid frame includes a tongue extending from said rigid frame to the draw bar of a towing vehicle.

14. The implement of claim 1, wherein said rigid frame includes a 3-point lift assembly for connecting to a towing vehicle.

15. An implement comprising:
a rigid frame assembly a front roller and a rear roller jounalled thereon for rolling engagement with the ground surface;
said rear roller being located behind said front roller in tandem relation relative to the direction of travel of the implement during use thereof;
said front roller and said rear roller having a plurality of formations that penetrate the ground surface;
said formations being disposed in selected spaced apart relation circumferentially around and longitudinally along said front roller and said rear roller;
drive means interconnecting said front rollers and said rear roller inter-relating rotation of the same in a predetermined ratio;
compacting roller means extending from a pair of spaced apart pivot arms pivotally connecting to said rigid frame trailing said rear roller;
rear roller depth control means for raising and lowering said compacting roller means for controlling the depth of said rear roller; and
wherein said rear roller depth control means includes hydraulic means supported by a frame member with said hydraulic means pivotally connecting to a coupling extending from a transverse arm support member extending between said spaced apart pivot arms supporting said compacting roller means.

16. The implement of claim 15, further comprising a hopper mounting on said rigid frame and means for dispensing seeds, fertilizer, or granular material therefrom.

17. The implement of claim 16, including means for controlling the flow of the said seeds, said fertilizer, and said granular material flowing from said hopper.

18. The implement of claim 15, wherein said hydraulic means is selected from the group consisting of an electrically driven hydraulic cylinder and a fluid driven hydraulic cylinder.

19. The implement of claim 15, wherein said coupling connected to said hydraulic means comprises a slotted coupling providing limited floating motion to said compacting roller means.

20. The implement as defined in claim 15 wherein at least one of said front roller and said rear roller includes a plurality of plate-like members defining roller blades disposed in selected spaced apart relation having a plurality of formations projecting from the outer periphery thereof.

21. The implement as defined in claim 20 wherein the spacing between said plurality of formations on said rear roller overlaps a plurality of formations on said front roller.

22. The implement as defined in claim 20, wherein said formations comprise teeth.

23. The implement as defined in claim 20, wherein said blades have a leading edge that extends radially with respect the axis of rotation of said front roller and said rear roller and a trailing edge disposed at a selected angle thereto.

24. The implement as defined in claim 15 wherein said rear roller rotates at a different selected rate of speed than said front roller.

25. The implement as defined in claim 15 wherein said compacting roller means comprises a plurality of wheels.

26. The implement as defined in claim 15 wherein said compacting roller means comprises at least one roller.

27. The implement of claim 15, wherein said rigid frame includes a tongue extending from said rigid frame to the draw bar of a towing vehicle.

28. The implement of claim 15, wherein said rigid frame includes a 3-point lift assembly for connecting to a towing vehicle.

* * * * *